UNITED STATES PATENT OFFICE.

MAURICE BOUVIER, OF LYON, FRANCE, ASSIGNOR TO SOCIETE CHIMIQUE DES USINES DU RHONE, ANCIENNEMENT GILLIARD P. MONNET ET CARTIER, OF PARIS, FRANCE.

PROCESS FOR OBTAINING HALOGEN DERIVATIVES OF INDIGO AND OF ITS HOMOLOGUES.

1,414,335. Specification of Letters Patent. Patented May 2, 1922.

No Drawing. Application filed October 1, 1918. Serial No. 256,400.

*To all whom it may concern:*

Be it known that I, MAURICE BOUVIER, a citizen of the Swiss Republic, of 25 Cours Gambetta, Lyon, France, have invented a certain new and useful Process for Obtaining Halogen Derivatives of Indigo and of Its Homologues, of which the following is a specification.

This invention relates to processes for obtaining halogen derivatives of indigo and of its homologues for use as colorants or dyes.

The object of the invention is to provide a process of the kind indicated whereby the output of halogenated indigo is improved both as to quantity for a given expenditure of materials and also as to the quality of the colorants obtained.

As is well known, halogens react on indigo and its homologues either directly or in the presence of suitable solvents. The substitution is more or less complete according as the operation is carried out at a high or low temperature and it is also greatly influenced by the nature of the solvent. Several processes have heretofore been proposed comprising the employment as solvent, of sulphuric chlorhydrin (chlorosulphonic acid) either alone or mixed with fuming sulphuric acids. The use of sulphuric chlorhydrin is advantageous in many respects, but it has a great disadvantage especially in the preparation of derivatives which are not completely halogenated. When bromine, for instance, acts on indigo in the presence of sulphuric chlorhydrin, hydrobromic acid results, which is oxidized into bromine; water is formed, and this in turn reacts on the chlorhydrin and decomposes it into sulphuric and hydrochloric acids.

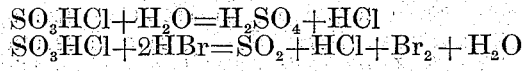

The reaction takes place as if this nascent sulphuric acid sulphonated the indigo and the output of halogenated indigo insoluble in water, is correspondingly reduced. In addition the quality of the product is altered and the halogenated indigos thus produced, colour textile fibres in tints much less pure and less vivid than the correspondingly halogenated indigos prepared by other processes.

It is possible, up to a certain point, to counteract this disadvantage by employing a large excess of bromine but this introduces a fresh difficulty, the sulphonation is somewhat prevented but it is very difficult to introduce into the molecule of indigo the necessary quantity of bromine for obtaining the desired halogenated derivative.

In the process according to this invention, the formation of nascent sulphuric acid is avoided during the bromination of the indigo and of its homologues in sulphuric chlorhydrin, by causing the said bromination to take place in the presence of a substance having a greater affinity for water than sulphuric anhydride. Of the substances which possess this property, phosphoric pentoxide is particularly advantageous as it dissolves perfectly in sulphuric chlorhydrin, and during the bromination, it absorbs the water formed by the oxidation of the hydrobromic acid, and thus is converted into meta-pyro- or ortho-phosphoric acids according to the relative quantity of water formed.

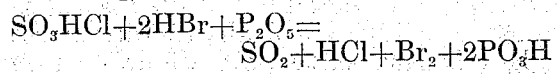

Sulphurous anhydrid is thus liberated and one half less of hydrochloric acid than would have been liberated in the absence of the phosphoric pentoxide or the like substance.

This process is applicable to all the brominated derivatives of indigo and of its homologues as well as to the mixed halogenated derivatives.

In order that the nature of the invention may be well understood, the application of the process in accordance therewith will now be described as employed in the preparation of the following useful compounds which serve as examples.

*Example I.—Tetrabromindigo.*

8 parts of sulphuric chlorhydrin are placed in an apparatus provided with a mixer, the solution is cooled down to —10° C. and 0.9 part of phosphoric pentoxide is added, then 1.0 part of bromine (two atoms). The whole is stirred during several seconds after which are added a little at a time 2.625 parts of 5-5' dibromindigo (one molecule). The temperature is allowed to rise during the space of two hours to 0° C. and the mixture is stirred during 7 hours at this temperature.

The mixture is then poured on to ice, and the colouring matter thus obtained is filtered and washed consisting of pure tetrabromindigo which is in all probability the 5-7-5'-7' tetrabromindigo. The dyes obtained by this product are more beautiful, more vivid, and fresher looking than these produced by tetrabromindigo prepared without the use of phosphoric pentoxide.

It is also possible to obtain very good results by first placing the dibromindigo in the apparatus and then pouring in slowly the mixture previously prepared and cooled of sulphuric chlorhydrin, phosphoric pentoxide, and bromine.

*Example II.—Tribromo-o-tolylindigo.*

In an apparatus provided with a mixer, are placed 15.5 parts of sulphuric chlorhydrin, one part of bromine and 0.5 part of phosphoric pentoxide. This is cooled to —5° or as far as —10° C. and during a period of 15 minutes 5.6 parts of dibrominated o-tolylindigo i.e., 7-7' dimethyl-5-5'-dibromindigo (1 molecule) are added.

The temperature is then allowed to rise to 0° C. during a space of two hours and the mixture is stirred at this temperature during 5 hours more, after which it is poured on to pounded ice and diluted with water. The colouring matter is precipitated, then filtered and washed.

The trihominated -o-tolylindigo thus obtained is a powder of a fine blue violet colour; it is easily reduced by alkaline hydrosulphite to a yellow greenish vat and dyes cotton to a very pure blue considerably more vivid and of a more reddish colour than that obtained by the dibrominated o-tolylindigo.

*Example III.—Tetra bromo-o-tolylindigo.*

The process is similar to that just described in Example II but the proportions are:—
7.8 parts of sulphuric chlorhydrin one part bromine (1 molecule) 1 part of phosphoric pentoxide. This solution is cooled down to —5° or as far as —10° C. whereupon for half an hour 2.8 parts of dibromo-o-tolylindigo (1 molecule) are added little at a time. The temperature is then allowed to rise to 20° C. for three hours, and for six hours more the mixture is stirred at this temperature. The mass is then poured on to pounded ice when the colouring matter is precipitated.

It contains a proportion of bromine corresponding to tetrabromo-o-tolylindigo and somewhat resembles the tribromo derivative giving a greenish yellow vat which dyes cotton to a very fine and pure reddish blue.

In Examples II, and III, it is understood that one can start from ortho-tolylindigo itself or from any one of its halogenated derivatives to obtain compounds more highly halogenated. Greater or lesser quantities of the halogen (bromine) will in this case be introduced into the combination, and the quantity of phosphorous pentoxide required will be simultaneously varied. It will be seen that mixed halogenated compounds may readily be obtained in starting, for instance, from the chlorinated derivatives of o-tolylindigo and in brominating them by the process just indicated; in this case, more or less of the halogen will be introduced and at the same time the quantity of phosphoric anhydride will be varied.

The mixed brominated derivatives can also be obtained by this process and, instead of bromine, substances such as alkaline bromides which produce bromine in the presence of sulphuric chlorhydrin may be employed. In each case, a suitable quantity of phosphoric anhydride will be used.

The compounds described in the above Examples II, III, IV, and V are new and possess great value; when used as dyes their tints are distinct from those of the mono- and dihalogen derivatives of o-tolylindigo described in French Patents 322864 and 323977; in fact the new tints are much richer, more brilliant, and purer than those obtained by the said known compositions.

In the following table are brought together a few of the properties of the new colouring matters obtained by the present invention:

| Solution in— | Tribromo-o-tolylindigo. | Tetrabromo-o-tolylindigo. | Pentabromo-o-tolylindigo. | Hexabromo-o-tolylindigo. |
| --- | --- | --- | --- | --- |
| Concentrated sulphuric acid. | Green. | Green. | Green. | Slightly soluble green. |
| Hot sulphuric acid. | Dark green. | Dark green. | Dark green. | Brownish green. |
| Cold aniline. | Greenish blue. | Greenish blue. | Green. | Green. |
| Hot aniline. | Pinkish pure blue with slight transparency. | Pure purplish blue with slight transparency. | Reddish blue with slight transparency. | Reddish blue with slight transparency. |
| Cold nitrobenzene. | Slightly greenish blue. | Greenish blue. | Pinkish green blue with slight transparency. | Slightly soluble greenish blue. |
| Hot nitrobenzene. | Pinkish blue with slight transparency. | Reddish blue with slight transparency. | Reddish blue with slight transparency. | Violet blue with slight transparency. |
| Chloroform. | Purplish blue. | Blue. | Slightly soluble blue. | Slightly soluble greenish blue. |
| Acetone. | Purplish blue. | Blue. | Very slightly soluble blue. | Very slightly soluble green. |
| Benzene. | Purplish blue. | Blue. | Slightly greenish blue. | Slightly soluble greenish blue. |
| Alcohol. | Blue. | Slightly soluble blue. | Very slightly soluble greenish blue. | Very slightly soluble green. |
| Carbon tetra-chloride. | Blue. | Slightly soluble blue. | Slightly soluble greenish blue. | Very slightly soluble green. |
| Alkaline hydro-sulphite vat. | Greenish yellow. | Greenish yellow. | Greenish. | Greenish. |
| Dyeing on cotton. | Reddish bright blue. | Reddish bright blue. | Greenish bright blue. | Very greenish bright blue. |

What I claim and desire to secure by Letters Patent is:—

1. A process for the manufacture of halogenated derivatives of indigo and its homologues by brominating the said indigo, its homologues and its substitution products by means of bromine in sulphuric chlorhydrin, in presence of a substance having a greater affinity for water than sulphuric anhydride.

2. A process for the manufacture of halogenated derivatives of indigo and its homologues by brominating the said indigo, its homologues and its substitution products by means of bromine in sulphuric chlorhydrin, in presence of phosphoric pentoxide.

3. The process of manufacturing halogenated derivatives of indigo and its homologues which consists in mixing together a solution of sulphuric chlorhydrin, phosphoric pentoxide and bromine, stirring the mixture, and adding thereto a derivative of ortho-tolylindigo.

4. The process of manufacturing halogenated derivatives of indigo and its homologues which consists in mixing together a solution of sulphuric chlorhydrin, phosphoric pentoxide and bromine, cooling said mixture, and adding thereto a derivative of ortho-tolylindigo, and raising the temperature of the mixture.

5. The process of manufacturing halogenated derivatives of indigo and its homologues which consists in mixing together a solution of sulphuric chlorhydrin, phosphoric pentoxide and bromine, cooling said mixture to a temperature between —5° and —10° C., adding thereto a derivative of ortho-tolylindigo, and raising the temperature to between 0° and 20° C.

In testimony whereof I have signed my name to this specification.

MAURICE BOUVIER.

Witnesses:
MARIN VACHOR,
L. ERCHER.